Aug. 4, 1942.                J. A. C. YULE                 2,292,313
                            HALFTONE SCREEN
                        Filed April 19, 1940          3 Sheets-Sheet 1
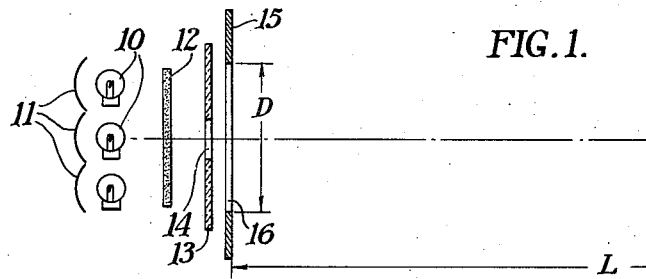
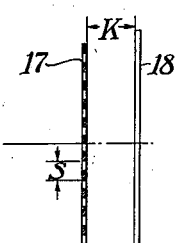
FIG. 2.
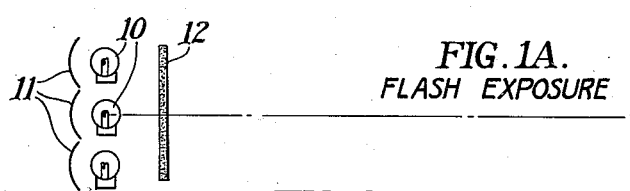
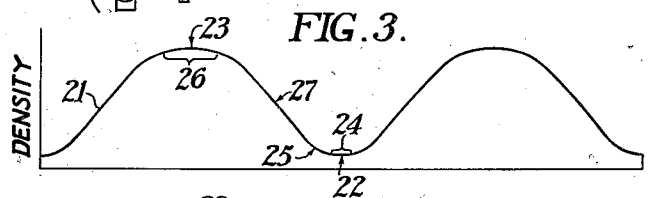
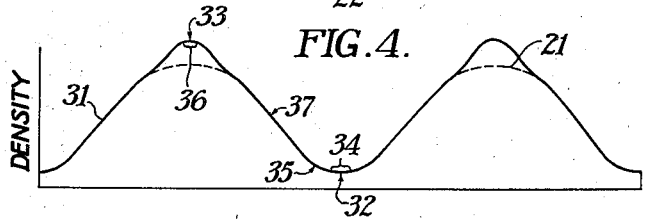
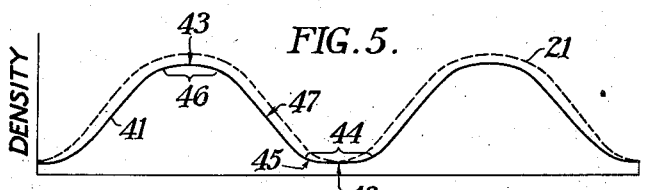
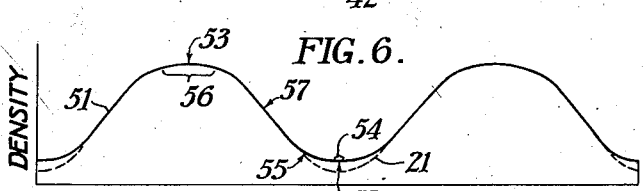
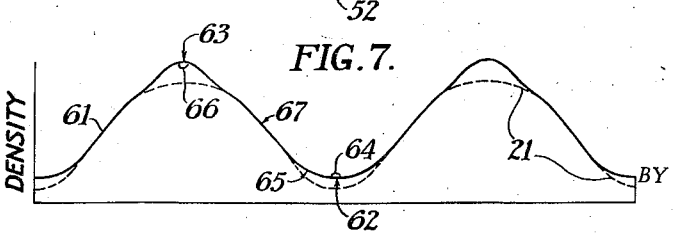
JOHN A. C. YULE
INVENTOR
ATTORNEY Aug. 4, 1942.    J. A. C. YULE    2,292,313
HALFTONE SCREEN
Filed April 19, 1940    3 Sheets-Sheet 2

JOHN A. C. YULE
INVENTOR

BY

ATTORNEY

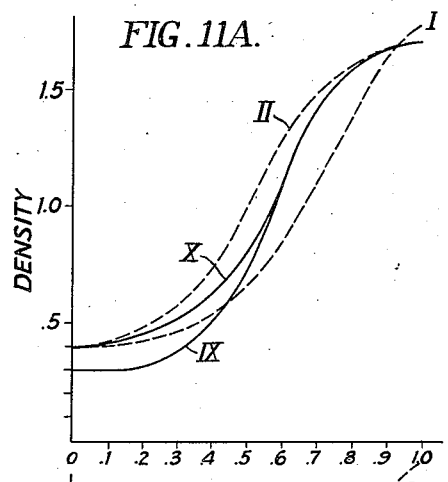
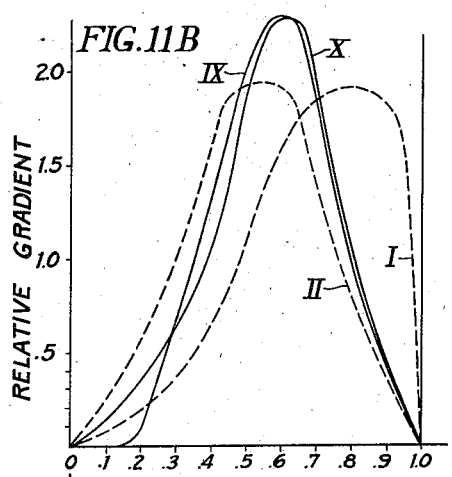
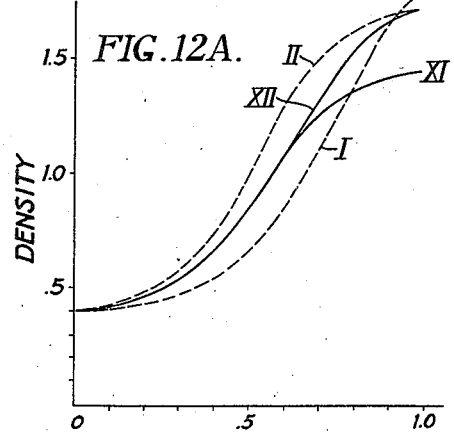
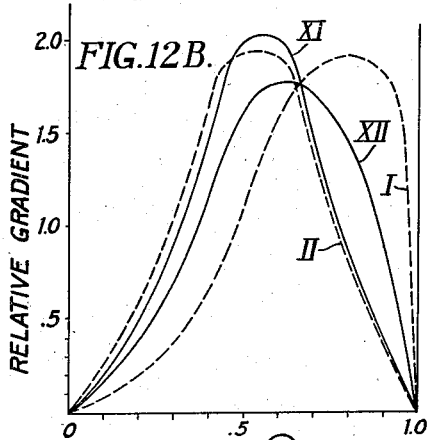
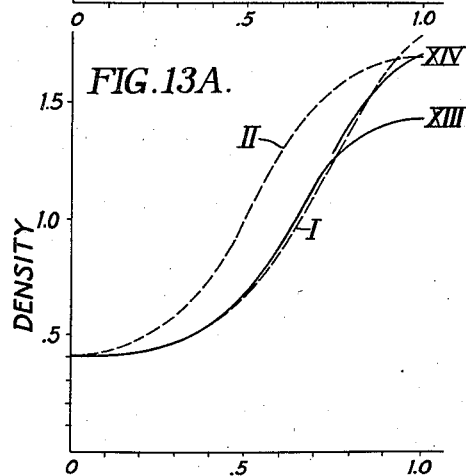
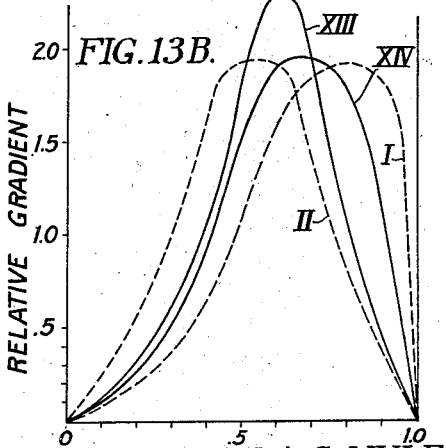
JOHN A. C. YULE
INVENTOR
BY
ATTORNEY Patented Aug. 4, 1942

2,292,313

UNITED STATES PATENT OFFICE 2,292,313

HALFTONE SCREEN

John A. C. Yule, Rochester, N. Y., assignor to Eastman Kodak Company, Rochester, N. Y., a corporation of New Jersey Application April 19, 1940, Serial No. 330,565

13 Claims. (Cl. 95—81)

This invention relates to photomechanical processes and particularly to halftone screens used in those processes.

It is an object of the invention to provide a halftone screen, specifically a contact halftone screen for use in making positives from continuous tone negatives, which screen gives improved quality in the highlights of the halftone prints made therewith.

It is also an object of the invention to provide a method of making such a screen.

It is an object of the invention to provide a method of making a contact screen whose quality is practically independent of errors in density caused by either the light intensity or the strength of the developer used in making the screen varying from the correct values which errors among others appear if one attempts to improve quality by underexposing the screen.

It is a particular object of the invention to provide a method of making a screen for use in the process described in my copending application, Serial No. 330,566 filed concurrently herewith.

It is also an object of the invention to provide an improved form of the screen described by Alexander Murray in his copending application Serial No. 330,567 also filed concurrently herewith. The present invention should be applied only to screens to be used in making positives, whereas Murray's invention is applicable in its general form either to screens for positives or to screens for negatives.

According to the invention, a contact halftone screen is made up in which the density gradient in the region which controls the highlights i. e. the region of least density of the screen, is zero only right at the center of this region and changes from this zero gradient value only slowly as the regions of greater density are approached. This eliminates distortion in the tone of the highlights of a halftone print made therewith.

The gradient is, of course, zero in the center of the regions of least density because the density increases on both sides of this region. In ordinary contact screens this gradient changes very rapidly from zero reaching its average value almost immediately. The description of the present invention requires certain dimensions and characteristics of a halftone dot of the variable density (contact) type to be carefully defined. The width of the dot is the distance between the centers of successive dots. Since the density distribution is arranged diagonally (as will be better understood from the description of Fig. 8) the points of minimum density are at the corners of each dot and are not halfway between successive centers. That is, the corners of the dot refer to the corners of a complete screen element, and do not correspond to the corners of middle tone dots in a screen negative. Thus, the density is a maximum at the center and a minimum at the corners and hence the density gradient is zero at each of these points. Density gradients are always measured radially from the center of the dot i. e. normally through the isodensity contours of the dot which are substantially square or slightly pincushioned about the center or corners. The gradients specifically considered here are those measured diagonally on the dot, i. e. on a line from the center to the corners. When giving a numerical value to the gradient, the distance from the corner to the center (i. e. one-half of the diagonal) is taken as unity hence the average gradient numerically equals the difference between the maximum density and the minimum density of the dot. (The invention when applied to halftone screens having lines instead of dots considers the ridge of the line as the centre and the edge of the line as the corner.)

Since the gradient of any point on the dot diagonal depends on the average gradient of the dot, the gradient distribution of different types of dots is best compared in terms of the ratio of the gradient to the average gradient. This will remove from the comparison any effect due to the fact that the dots have different average gradient values (i. e. different overall contrast). This ratio will be termed "the relative gradient" because it is, for any one point on the diagonal, the gradient of that point relative to the other gradients and to the average gradient.

In the halftone dot of an ordinary contact screen, the relative gradient starting at zero at the corner of the dot reaches unity about .30 of the way to the center and falls off again to unity about .75 of the way. According to the invention I have found that when a screen is to be used for making positives, much better results are obtained if the relative gradient at the .30 mark is between .3 and .7 and does not reach unity until between .38 and .55 of the way and preferably between .40 and .50 of the way along the diagonal toward the center of the dot. That is the gradient is less than unity at the .38 point on the diagonal.

If, without employing the present invention, one were to attempt to produce a screen having this gradient distribution (i. e. less than .7 at the .30 point and less than unity at the .38 point on the diagonal) merely by underexposing, there would be a large area near the corner of each dot completely unexposed. Thus the gradient and the relative gradient would be zero not only right at the corner but over a large area extending practically to the .2 point on the diagonal. Such a screen would not give perfect results, since there would be extreme contrast in the highlights of the picture. A screen according to the present invention is one having zero gradient only at the corners (and at the centers of the dots) and having a relative gradient varying slowly from this zero value along the dots diagonal, which relative gradient has a value between .3 and .7 at .30 of the way to the center and a value of unity between .38 and .55 of the way to the center. I have found that screens with these characteristics give excellent halftone positives, so good, in fact, that such a positive made through a 133 lines per inch screen looks at least as good as one made with a 175 line screen of the regular (non-contact) type.

Furthermore any improvement of ordinary contact screens by underexposure requires extreme accuracy in the exposure. The effects of any errors over the range usually encountered by variations in lamp intensity or variations in developer strength, are eliminated by the present invention which permits considerable latitude in this regard.

In the preferred embodiment of the invention, the relative gradient is also improved in the region of the center of the dot. That is, instead of falling off to unity at about the .75 point on the diagonal it is kept up to between 1.2 and 2.5 at this mark and decreases to unity between the .85 point and the center (1.0 point) preferably between the .92 and .98 points.

This invention is particularly applicable to screens in which the shadow quality has been improved, because by having correct highlight quality, this preferred embodiment permits image contrasts to be used to take full advantage of the corrected shadow quality and because it does not interfere with the control of shadow quality. I prefer to use this invention with transparent dye image contact screens since such screens permit full realization of the corrected tonal qualities in the highlight regions.

One method of producing such a screen according to the invention consists of giving an overall flash exposure to a photosensitive layer which has been or is to be exposed through a regular halftone screen in the usual manner employed in making ordinary contact screens. The main exposure is to a shadow image cast by a regular (cross line) halftone screen placed a suitable screen distance in front of the sensitive surface. Of course, the present invention is equally applicable to all types of contact halftone screens such as line screens, but the advantages of the square dot type of screen over the other types has been so well established, that I will describe only the application of the invention to the square dot type.

The flash exposure has two effects. In the first place, it is relatively easy to control the ratio of fluash to main exposure whereas it is not so easy to insure that the absolute values of the two exposures shall be correct. For example, the light source may have an intensity different from that it had on the day the first trial runs were made or the developer may be slightly stronger, colder, etc., than usual. If the main exposure is underexposed and no additional flash is given, any change in exposure completely changes the density distribution and the gradient distribution in the dot. The flash exposure may be regarded as changing the shape of the H & D curve of the emulsion. With the flash exposure according to the present invention, an increase in development or main exposure is accompanied by a raising of the toe, and vice versa. This change is such as to materially reduce the changes in gradient distribution. For example overexposure of both the main and flash exposures gives a more dense screen but the density distribution is practically unchanged whereas if only the main exposure is used, overexposure brings all exposures up on to the straight line portion of the characteristic curves of the emulsion used so that the effect of the toe of this curve on the density distribution curve is completely lost.

The second effect of the flash exposure is to give a screen whose density distribution and gradient distribution approach that of the screens described above which I have found to give such excellent results. Thus an improved screen results from this process. However, the screen itself is not within the preferred range if the main exposure and development etc. are exactly the same as those normally used for ordinary contact screens. Two additional steps which may be used alternatively or together are necessary to bring it within said preferred range. Either the average gradient corresponding to the main exposure must be increased to be later brought back by the flash exposure, which results in a dense screen or the main exposure must be underexposed (i. e. limited to that which is slightly less than necessary to induce a latent image in the regions of the layer most shadowed by the regular screen) and the flash used to give density and gradient to the highlight regions which are not otherwise sufficiently exposed to have any density (other than "fog"). Either of these methods gives a screen according to the invention which may alternatively be made by the direct method of drawing a large picture of the desired screen with exactly the gradient distribution desired and photographing this. Either method may be used separately or they may be combined in any proportion by underexposing, giving a high flash and then processing to the contrast necessary to give the desired average gradient.

The main exposure may also be controlled to give excess exposure to the regions most exposed (the centers) whereby the quality of the shadow controlling regions of the screen is also improved. This permits even better control of the low corner densities by the flash exposure.

While the exact manner of applying the flash is not a critical feature of the invention, I have found that its effect can be varied in numerous ways. The flash may be through a color filter and the relation of this color to the spectral sensitivity of the emulsion determines the relative effect of the flash on different densities. In general, the flash has the effect of providing a very long toe on the characteristic curve of the emulsion. Varying the color of the flash varies the shape of this toe. Of course, varying the total amount of the flash varies the length of the toe which can be calculated approximately. However, due to failure of the reciprocity law of exposures and possibly due to unexplained causes, the shape does not conform with the calculations and can be varied by the color of the flash, the intensity of the flash (the more intense being exposed for shorter times) and by whether the flash is given before or after the main exposure.

After receiving the main exposure (ordinary, under, with additional center exposure and/or high contrast) and the overall flash, the layer is developed in any suitable manner, e. g. to an ordinary silver image or to a transparent dye image.

Other objects and advantages of the invention and the invention itself will be fully understood from the following description when read in connection with the accompanying drawings, in which:

Fig. 1 illustrates the step of giving the main exposure when making a contact halftone screen.

Fig. 1A illustrates the step of giving the overall flash according to the invention.

Fig. 2 is an enlarged cross section of a contact halftone screen.

Figs. 3 to 7 illustrate the density distribution in the halftone elements of a contact halftone screen; Figs. 6 and 7 relate specifically to the present invention.

Figure 8:
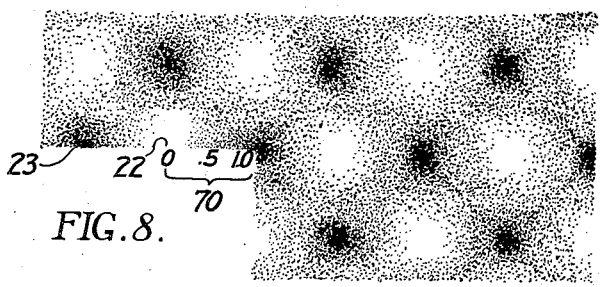
Fig. 8 is an enlarged section of a contact halftone screen of the usual type.

Figs. 9A to 13B inclusive are graphs comparing the density distribution and the relative gradient distribution of fourteen different kinds of contact halftone dots.

In Fig. 1, a bank of lamps 10 with or without suitable reflectors 11 illuminates a diffusing medium 12 such as a ground glass or opal glass. A single lamp and a ground glass is not preferred because the diffusion of the ground glass is not great enough. A single lamp or a bank of lamps works satisfactorily with an opal glass for the diffusing plate 12, but I prefer to employ four lamps placed at the corners of a square and a ground glass. Any of these arrangements give uniform distribution of light over the diaphragm opening 16 which may be square, round, or oblong. Light from this source (10, 11, 12) illuminates the diaphragm 15 having the aperture 16 whose width is D and through this aperture exposes a photosensitive layer 18. The four-lamp arrangement gives a substantially uniform distribution of light at the film 18 because actually the aperture 16 is small compared to the lamps 10 so that through the aperture 16, each lamp tends to send more light to the corners than to the center of the film 18. This compensates for the falling off in illumination due to the greater distance from the aperture 16 to the edges of the film than to the center. Of course, the effect is small due to the diffusion of the ground glass 12. The distribution of light over the aperture 16 determines the intensity distribution in each element of the shadow of the screen 17 and the distribution of light over the ground glass 12 which in practice is much larger than the aperture 16 and back some distance from it, determines the intensity distribution over the whole image on the film.

An ordinary cross line screen 17 whose interval S is made up of lines and openings preferably of equal width is placed a distance K in front of the layer 18 to cast a shadow thereon. The actual value of K generally does not correspond to that calculated by simple geometry due to diffraction and other phenomena; it is known that K should be greater when high contrast emulsions are used. K is usually between $$\frac{SL}{4D} \text{ and } \frac{SL}{D}$$

and preferably between $$\frac{SL}{3D} \text{ and } \frac{SL}{2D}$$

where L is the distance between the diaphragm 15 and the layer 18. The dimensions of D, S and K, are obviously greatly exaggerated in the drawings relative to the other elements.

This exposure to a shadow image of the regular screen 17 constitutes the "main" exposure used both in the present invention and in the prior processes. This main exposure may be underexposed and/or may receive an additional center exposure (i. e. additional exposure to the regions least shadowed by the screen). The additional center exposure may be produced by giving a supplementary exposure to an opening whose diameter is less than D or as shown in Fig. 1 by placing a neutral density 13 having an opening 14 concentric with the opening 16 adjacent to the mask or diaphragm 15. Before, during or after receiving the main exposure of any of the above types, the photosensitive layer 18 is, according to the invention, given an overall flash as shown in Fig. 1A. That is, the screen 17 is removed or moved forward so that its shadow is completely diffused and white or colored light is allowed to fog the photosensitive layer slightly. This overall flash being uniform has most effect on the regions least exposed by the main exposure. The minimum density is increased considerably without any appreciable increase in the maximum density at the centers of the elements and hence the average gradient is reduced. This is compensated for by using more contrasty emulsions and more contrasty processing. The greater the flash, the more must be the contrast introduced to maintain the correct average gradient which should be between .9 and 1.8 or 2.0, preferably between 1.2 and 1.6. Suitable development of the layer 18 gives a halftone screen 20 illustrated in enlarged cross section in Fig. 2.

Figs. 3 to 7 illustrate in a general manner the effects of the various ways in which the exposure can be changed. These curves do not show any of the effects caused by a change in contrast due to the emulsion selected or to the type of processing.

In a positive made through any of these contact halftone screens, the contrast, i. e. the tonal qualities, depends on the areas of the elements in the usual halftone manner which areas in turn depend on the gradient of the screen elements. The highlight regions of the print have only small dots which are due to the low intensity exposures getting through the least dense regions of the screen and hence the tonal quality of the highlights is controlled by the density gradient in the region 24 of the curve 21; similarly the middle tones depend on the region 27 and the shadows depend on the region 26. The steeper the gradient at any point on the curves 21, 31, 41, 51, and 61, the flatter, i. e. less contrasty, is the tone of the resulting positive because a change in intensity causes only a small change in dot area when the gradient of the screen is steep. Similarly low gradients result in high contrast pictures.

Fig. 3 represents the effect of an ordinary "main exposure." This is the exposure received by an ordinary halftone screen not incorporating the invention. Such a screen has two main faults. Assuming that the average gradient, i. e. the difference in density between the point 22 and the point 23 has been adjusted by proper development to the correct value, the gradient at the point 27 is slightly too high and the gradients throughout the region 24 and particularly at the point 25 are much too high. On the other hand the gradients over the region 26 are too low and result in too high a contrast in the shadows of a print made with this screen.

If this main exposure includes an additional exposure of the centers of the dots the region 26 over which the gradient is too flat will be reduced to almost negligible proportions as shown by the region 36. There will be no redistribution of densities in the regions 34, 35, and 37, but since the overall density difference between the points 33 and 32 and hence the average gradient is increased in the arrangement shown in Fig. 4, the relative gradient at the points 35 and 37 are much less than at the points 25 and 27.

If one were to attempt to make a screen according to the invention merely by underexposing this main exposure, the arrangement shown in Fig. 5 would result. In this arrangement, the gradient at the point 45 would possibly be reduced to the correct value, but the region 44 around the point 42 which is the corner of a dot would have zero gradient which would give extreme contrast in the highlights. Furthermore, the average gradient as measured by the density difference between the points 43 and 42 has been reduced and hence the relative gradient of the point 47 is greater than of the point 27. That is, if this arrangement shown in Fig. 5 were processed so as to have the proper average gradient, the actual gradient at the point 47 would be steeper than that at the point 27.

According to the invention the main exposure which may be ordinary, may be underexposed as shown in Fig. 5 or may have the additional center exposure shown in Fig. 4, is augmented by a flash exposure which gives the results shown in Figs. 6 and 7. In Fig. 6 the main exposure does not include any additional center exposure and hence the points 51 and 53, and the region 56 are effectively the same as the points 47 and 43, and the region 46 and are also the same as the points 27 and 23, and the region 26. However, the gradient in the region of least density 54 is zero only at the center 52 of this region i. e. at the corner of the dot and changes only slowly from this zero gradient value through a low gradient as indicated by the point 55 to a maximum gradient at the point 57 somewhere in the region of average densities.

If the main exposure corresponds exactly to that shown in Fig. 3 and the flash exposure is given, the gradient distribution while somewhat improved is still not sufficient to give the preferred form of screen. However, either of two alternative modifications are possible. In one of these, a very large flash exposure is given and the screen is processed to a high contrast. In the second case the main exposure is underexposed as shown in Fig. 5 and the flash exposure given to this underexposed screen before development. Combinations of the two are also possible. In fact the most preferred embodiment employs underexposure with a fairly high flash and contrasty development to give the correct average gradient.

Any of these preferred embodiments of the invention can be further improved by giving the additional center exposure to the main exposure as illustrated in Fig. 4. This results in the preferred embodiment of the invention illustrated by Fig. 7 wherein the points 63 and 66 correspond to the points 33 and 36 and the points 62, 64, and 65 correspond to the points 52, 54, and 55. Of course the average gradient is greater in the arrangement shown in Fig. 7 than in the arrangement shown in Fig. 6 and hence the relative gradient of the point 67 is less than the relative gradient of the point 57.

Fig. 8 illustrates the general appearance of the dots of a contact halftone screen as viewed through a microscope. The points 22 and 23 of curve 3 are shown in this Fig. 8. A point such as the point 22 is said to be the corner of a dot, and the point 23 to be the center of a dot. Thus the lines or edges dividing dots are diagonal and vary in density from corner to corner as shown in this Fig. 8. The distance 70 from the point of least density to the point of greatest density i. e. from the corner to the center is taken as unity when measuring density gradient. It is obvious that if one were to proceed from the center of one dot to the center of an adjacent dot the density would never fall to its minimum value but would actually fall at the edge to a density about halfway between the minimum and the maximum value. Other types of dot arrangements could be used, but since this is the most satisfactory type of contact screen whether incorporating the present invention or not, the present specification is limited to a description in terms of such a dot arrangement. It will be noticed that the distance 70 is scaled off so that the point 22 is at the zero mark and the center 23 of the dot is at the 1.0 mark and halfway between the corner and the center is marked .5. Intermediate points on this scale are not marked but the curves in Figs. 9A to 13B are drawn through points computed for the .1, .2, .3, etc. points.

In a halftone positive made through a screen of this type, the middle tones appear as square dots whose centres correspond to the corners of the screen elements and whose corners correspond to the middle of the edges of the screen elements.

When all of the factors which affect the distribution of density over the elements of a screen are taken into account, it will be seen that almost innumerable types of dots may be produced. These factors consist of two groups, the first including the emulsion sensitivity, the contrast of the developer, the type of processing and the conditions of processing and the second involving the distribution of intensity in the light exposing the screen. The first group may be varied over ranges well known in the art to give various minimum and maximum densities and various average gradients. Except for very minute differences in the general shape of the characteristic curves of available emulsions none of these factors affect the distribution of density and the distribution of gradient over the dot. The various methods of varying the distribution of light intensity which can be combined in various ways to give different results include the additional center exposure, the underexposure and the overall flash. In order to make a quantitative comparison of the different effects separately and in combination fourteen types of dots have been selected out of almost innumerable possibilities. One of these is what I have found to be an ideal dot as far as tone control is concerned. Including this ideal dot, these different dots have the following characteristics respectively.

*Type I.*—The ideal dot; all dots of this distribution may be termed ideal. The one selected has a minimum density of .40 and a maximum density of 1.80 giving an average gradient of 1.40.

*Type II.*—A dot made by prior known methods (receiving only the main exposure) having a minimum density of .40 and a maximum density of 1.70. Of all possible prior art dots this one was selected because it gives results nearest to those of the ideal screen; in other words it is the best prior art dot.

*Type III.*—A dot similar to Type II with a minimum density of .40 and a maximum density of 1.43.

*Type IV.*—A dot similar to Type III with an additional center exposure to correct shadow quality, minimum density .40 and maximum density 1.70.

*Type V.*—A dot similar to Type II and having a minimum density of .30 and a maximum density of 1.70.

*Type VI.*—A dot receiving the main exposure of Type V with an overall flash according to the invention, minimum density 1.40 and maximum density 1.70.

*Type VII.*—A dot similar to Type II processed to a high contrast having a minimum density of .3 and a maximum density of 2.2.

*Type VIII.*—A dot receiving the same main exposure as Type VII and an additional flash exposure giving a minimum density of .92 and a maximum density of 2.22.

*Type IX.*—A dot receiving an underexposed main exposure. Minimum density .3, maximum density 1.7.

*Type X.*—A dot receiving the underexposed main exposure of Type IX and a flash according to the invention giving a minimum density of .40 and a maximum density of 1.70.

*Type XI.*—A dot receiving a main exposure similar to Type III and a flash exposure according to the invention, minimum density .40, maximum density 1.43.

*Type XII.*—A dot receiving the main exposure similar to Type IV and a flash exposure according to the invention, this differs from Type XI by having the additional center exposure included in the main exposure, minimum density .40, maximum density 1.70.

*Type XIII.*—A dot receiving an underexposed main exposure and a flash exposure according to the invention, minimum density .40, maximum density 1.43.

*Type XIV.*—A dot receiving an underexposed main exposure having an additional center exposure and a flash according to the invention, minimum exposure .40, maximum exposure 1.7.

Dots similar to VII and VIII but with additional center exposure as well as the high flash and contrasty processing and dots similar to XIII and XIV with high flash and contrasty processing as well as the underexposure are equally important; in fact they constitute the best possible form of the invention capable of carrying the dot characteristics past those of the ideal dot. However since their characteristics will be fully understood from the fourteen types given, they are not described specifically here.

Taking the point of minimum density, i. e. the corner of the dot as zero and the center as unity, the diagonal serves as a distance scale. The above type dots have the following density, gradient, and relative gradient distribution along this scale.

| Dot type | Density at distances | | | | | | | | | | | Average gradient |
|---|---|---|---|---|---|---|---|---|---|---|---|---|
| | 0 | .1 | .2 | .3 | .4 | .5 | .6 | .7 | .8 | .9 | 1.0 | |
| I | .40 | .41 | .43 | .47 | .54 | .66 | .86 | 1.11 | 1.37 | 1.65 | 1.80 | 1.40 |
| II | .40 | .43 | .49 | .58 | .74 | .99 | 1.29 | 1.49 | 1.61 | 1.68 | 1.70 | 1.30 |
| III | .30 | .32 | .37 | .47 | .60 | .81 | 1.03 | 1.24 | 1.35 | 1.41 | 1.43 | 1.13 |
| IV | .30 | .32 | .37 | .47 | .60 | .81 | 1.03 | 1.27 | 1.48 | 1.63 | 1.70 | 1.40 |
| V | .30 | .33 | .39 | .50 | .68 | .93 | 1.22 | 1.47 | 1.60 | 1.67 | 1.70 | 1.40 |
| VI | .40 | .42 | .47 | .56 | .70 | .93 | 1.22 | 1.47 | 1.60 | 1.67 | 1.70 | 1.30 |
| VII | .30 | .34 | .42 | .57 | .82 | 1.16 | 1.55 | 1.89 | 2.07 | 2.16 | 2.20 | 1.90 |
| VIII | .92 | .93 | .95 | 1.01 | 1.11 | 1.29 | 1.62 | 1.92 | 2.10 | 2.18 | 2.22 | 1.30 |
| IX | .30 | .30 | .31 | .39 | .50 | .75 | 1.09 | 1.42 | 1.59 | 1.67 | 1.70 | 1.40 |
| X | .40 | .42 | .45 | .52 | .63 | .82 | 1.11 | 1.43 | 1.59 | 1.67 | 1.70 | 1.30 |
| XI | .40 | .42 | .46 | .54 | .67 | .86 | 1.07 | 1.26 | 1.36 | 1.41 | 1.43 | 1.03 |
| XII | .40 | .42 | .46 | .54 | .67 | .86 | 1.09 | 1.31 | 1.53 | 1.65 | 1.70 | 1.30 |
| XIII | .40 | .41 | .43 | .48 | .55 | .69 | .90 | 1.17 | 1.34 | 1.41 | 1.43 | 1.03 |
| XIV | .40 | .41 | .43 | .48 | .55 | .69 | .90 | 1.17 | 1.41 | 1.62 | 1.70 | 1.30 |

| Dot type | Gradient at distances | | | | | | | | | | |
|---|---|---|---|---|---|---|---|---|---|---|---|
| | 0 | .1 | .2 | .3 | .4 | .5 | .6 | .7 | .8 | .9 | 1.0 |
| I | 0 | .11 | .28 | .50 | .91 | 1.55 | 2.26 | 2.58 | 2.69 | 2.56 | 0 |
| II | 0 | .34 | .77 | 1.30 | 2.08 | 2.51 | 2.50 | 1.82 | 2.07 | .51 | 0 |
| III | 0 | .29 | .67 | 1.13 | 1.81 | 2.18 | 2.17 | 1.58 | .93 | .44 | 0 |
| IV | 0 | .29 | .67 | 1.13 | 1.81 | 2.19 | 2.27 | 2.21 | 1.94 | 1.19 | 0 |
| V | 0 | .36 | .83 | 1.40 | 2.24 | 2.70 | 2.69 | 1.96 | 1.15 | .55 | 0 |
| VI | 0 | .27 | .64 | 1.16 | 1.92 | 2.60 | 2.63 | 1.96 | 1.15 | .55 | 0 |
| VII | 0 | .50 | 1.12 | 1.90 | 3.04 | 3.67 | 3.65 | 2.66 | 1.56 | .74 | 0 |
| VIII | 0 | .10 | .39 | .81 | 1.53 | 2.55 | 3.03 | 2.37 | 1.49 | .65 | 0 |
| IX | 0 | 0 | .10 | .94 | 1.92 | 2.94 | 3.35 | 2.84 | 1.44 | .59 | 0 |
| X | 0 | .18 | .44 | .85 | 1.51 | 2.47 | 3.09 | 2.60 | 1.43 | .59 | 0 |
| XI | 0 | .22 | .50 | .91 | 1.53 | 2.06 | 2.09 | 1.56 | .91 | .43 | 0 |
| XII | 0 | .22 | .50 | .91 | 1.53 | 2.08 | 2.29 | 2.21 | 1.86 | 1.12 | 0 |
| XIII | 0 | .14 | .35 | .67 | 1.20 | 1.96 | 2.46 | 2.06 | 1.13 | .46 | 0 |
| XIV | 0 | .14 | .35 | .67 | 1.20 | 1.96 | 2.46 | 2.50 | 2.28 | 1.43 | 0 |

| Dot type | Relative gradient at distances | | | | | | | | | | |
|---|---|---|---|---|---|---|---|---|---|---|---|
| | 0 | .1 | .2 | .3 | .4 | .5 | .6 | .7 | .8 | 9. | 1.0 |
| I | 0 | .08 | .20 | .36 | .65 | 1.11 | 1.61 | 1.84 | 1.92 | 1.83 | 0 |
| II | 0 | .26 | .59 | 1.00 | 1.60 | 1.93 | 1.92 | 1.40 | .82 | .39 | 0 |
| III | 0 | .26 | .59 | 1.00 | 1.60 | 1.93 | 1.92 | 1.40 | .82 | .39 | 0 |
| IV | 0 | .21 | .48 | .81 | 1.29 | 1.56 | 1.62 | 1.58 | 1.39 | .85 | 0 |
| V | 0 | .26 | .59 | 1.00 | 1.60 | 1.93 | 1.92 | 1.40 | .82 | .39 | 0 |
| VI | 0 | .21 | .49 | .89 | 1.48 | 2.00 | 2.02 | 1.51 | .88 | .42 | 0 |
| VII | 0 | .26 | .59 | 1.00 | 1.60 | 1.93 | 1.92 | 1.40 | .82 | .39 | 0 |
| VIII | 0 | .08 | .30 | .62 | 1.18 | 1.96 | 2.33 | 1.82 | 1.15 | .50 | 0 |
| IX | 0 | 0 | .07 | .67 | 1.37 | 2.10 | 2.40 | 1.96 | 1.02 | .42 | 0 |
| X | 0 | .14 | .37 | .65 | 1.16 | 1.90 | 2.38 | 2.00 | 1.10 | .45 | 0 |
| XI | 0 | .21 | .49 | .89 | 1.48 | 2.00 | 2.02 | 1.51 | .88 | .42 | 0 |
| XII | 0 | .17 | .39 | .70 | 1.18 | 1.60 | 1.76 | 1.70 | 1.43 | .86 | 0 |
| XIII | 0 | .14 | .34 | .65 | 1.16 | 1.90 | 2.38 | 2.00 | 1.10 | .45 | 0 |
| XIV | 0 | .11 | .27 | .52 | .92 | 1.51 | 1.89 | 1.93 | 1.76 | 1.10 | 0 |

The density and relative gradients as given in the first and third of the above tables are plotted in Figs. 9A to 13B. As far as screen quality is concerned, the absolute value of the density is not important, but longer exposures are required when the screen is dense. Since "relative" gradients are plotted in each case (Figs. 9B, 10B, etc.) the area under each curve is the same. The curves for Type I (the dot I have found to be ideal) and Type II (the best possible dot made by ordinary methods) are given in each one of these figures for purposes of comparison.

Figure 9A:
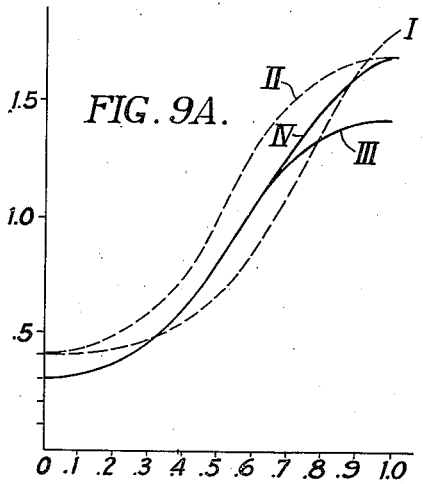
Figure 9B:
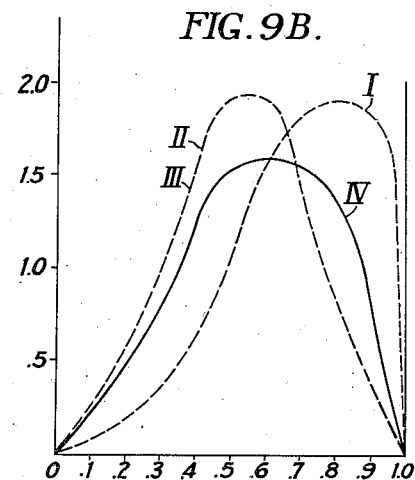

Figs. 9A and 9B illustrate the effect of the additional central exposure. Since dot Type I is ideal anything which brings the curves nearer to the curve for Type I than is Type II, is an improvement on the ordinary dot. Type III is an ordinary dot whose average gradient is only 1.13. This particular dot was selected since the addition of the additional center exposure to this dot brings its maximum density up to 1.70 so that it is comparable with the Type I and II. Type IV is the same as Type III except for the additional central exposure. In Fig. 9A, it would appear that Type IV is somewhat better than Type II. However, the improvement is not as great as would appear in 9A since the distribution of relative gradient is the important thing and it will be seen from Fig. 9B that the improvement in the corner of the dot i. e. near the zero end of the abscissa scale, is relatively small. The improvement in the center of the dot i. e. in the region of greatest density is quite considerable and hence this additional center exposure improves the shadow quality produced when using this screen. It will be noted in Fig. 9B that both of the ordinary dots Type II and Type III have the same distribution of relative gradient. In the above tables of gradient and relative gradient, the last significant figure in each value is doubtful and unimportant, but is included so that small differences can be illustrated.

Figure 10A:
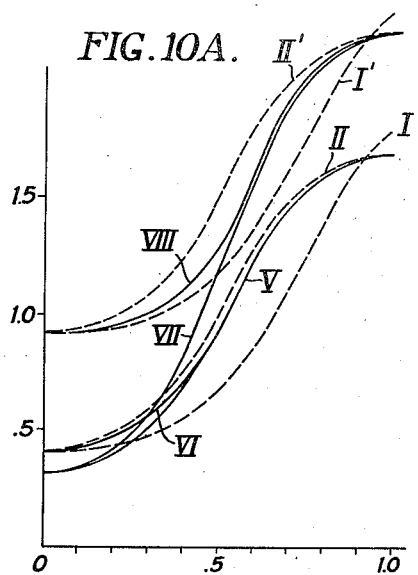
Figure 10B:
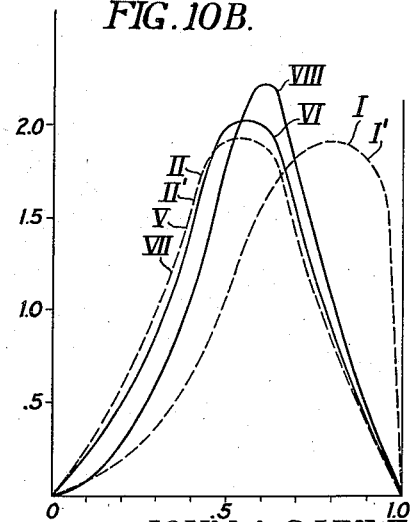

Figs. 10A and 10B illustrate the effect of giving an overall flash according to the present invention. If a dot is given a main exposure similar to the ordinary dot Type II and it is developed to have the same maximum density as Type II but with a lower minimum density so that the flash exposure brings it back to the same average gradient as Type II, the effect of the flash exposure is relatively small. Type V is an ordinary dot which has received a slightly higher contrast development than Type II. If identical emulsions were used, Type II and Type V would have the same fog density, but for comparison purposes a difference of .1 is taken such as might occur if Type II were on a film base having a very slight tint. When the main exposure of this dot V is supplemented by a flash exposure a dot of Type VI results and it will be seen from Fig. 10A that Type VI is slightly better than Type II. The relative gradient distribution of Type II and Type V are the same and Type VI shows a slight improvement in this regard also. However, the improvement is not sufficient to bring the dot characteristics within the range which I have found to be desirable.

The following is one method of making this improvement even greater. An ordinary dot similar to Type V is developed to a very high contrast as illustrated by Type VII. If the main exposure of this ordinary dot Type VII is supplemented by a very high flash sufficient to increase the minimum density by about .5 (.62 in the example given) and the dot is given the same development as Type VII the result is that shown as Type VIII. Since the overall density of this dot is very high, the curve for Type VIII appears quite high in Fig. 10A. In order to make the comparison of densities easy the curves for Types I and II have been replotted at higher density as broken lines shown as Type I' and II' respectively. It will be seen that the improvement of Type VIII over Type II' is considerably greater than the improvement of Type VI over Type II. This is particularly borne out in Fig. 10B wherein curve VII has the same relative gradient distribution as curves II and V but curve VIII is considerably better than curve VI. A halftone screen with the relative gradient distribution of Type VIII gives very good quality in the highlight regions. This embodiment may be combined with the underexposure of the main exposure whereby the overall flash and the development contrast need not be so great.

Figs. 11A and 11B illustrate the effect of underexposure of the main exposure. If one were to merely underexpose the main exposure, the result would be that of Type IX in which both the density distribution and the relative gradient distribution is apparently brought nearer to the ideal Type I. However, the density distribution curve is perfectly flat near the corner of the dot and the relative gradient is zero in this region. This results in extreme contrast in the highlights of a picture produced therewith and is not entirely satisfactory, although if the exposure is very accurately controlled there is a very slight improvement over prior contact screens. On the other hand, if the main exposure is underexposed and a flash exposure is given (resulting in dots of Type X) it will be seen from both Figs. 11A and 11B that a very great improvement has been made in the highlight region, i. e. in the region of least density of the dot. Thus the preferred embodiment of the invention involves either an underexposure before the flash is given or a high flash developed to a high contrast as in Type VIII or a combination of these two steps.

Figs. 12A and 12B illustrate the effect of combining a main exposure having the additional exposure of the center with a flash according to the invention. Type XI is a dot similar to Type III except that a flash exposure has been given. Type XII has an additional center exposure and differs from Type XI in the same way that Type IV differs from Type III. It will be seen that the combination of this additional center exposure and flash according to the invention gives very good results even without an underexposure of the main exposure or a development to a very high contrast as illustrated in Figs. 11A and 10A respectively.

Figs. 13A and 13B illustrate the effect of combining the steps illustrated by Figs. 11A and 12A. That is, the main exposure is underexposed but given an additional central exposure and a flash is added according to the invention. Type XII is the result when the main exposure is under exposed and a flash is given, but the main exposure does not include the center hump. Thus this Type XIII has received the same exposure as Type X but is developed to a lower average gradient. Type XIV differs from Type XIII by the additional central exposure. Thus Type XIV has been underexposed with an additional central exposure and then given an overall flash and processed to have the same average gradient as Type II. It will be seen that this Type XIV is almost identical to the ideal dot Type I. For all practical purposes it may be considered identical with the ideal dot Type I. Obviously this method of making a screen is much simpler than any involving the photography of a picture of an enlarged ideal dot. Attention is drawn to the fact that this so-called ideal is intended only for screens to be used in making positives from continuous tone negatives and was unknown prior to the present invention. The combining of the additional center exposure of Type XII and the under-exposure of Type IX together with the flash exposure of Type X or Type XII gives this excellent dot Type XIV. There is however another form of dot which is practically as good as Type XIV except for the high density. It is that dot, not illustrated, which combines the features of Type VIII and Type XII. That is, without any underexposure, the main exposure is given an additional center exposure and a very high flash and is then developed to a high contrast to bring the average gradient back to that required. Such a dot has a gradient distribution very similar to that of Type XIV and in practice gives excellent quality, and going one step still further, by underexposing a main exposure having an additional center exposure, giving a high overall flash and processing to a high contrast to get the correct average gradient, a dot is produced which practically matches Type I or can even be made to pass it which latter is not desirable.

Incidentally the combination of additional center exposure and overall flash as illustrated by Type XII (and Type XIV) has another advantage over Type IV which is not entirely apparent from the graphs. Assuming that the picture to be reproduced has a number of important details in the highlights as is usually the case, then if Type IV screen is used the continuous tone negative will have to be very contrasty to get proper contrast in the highlights of the continuous tone positive. With this contrasty negative, the middle tones and shadows will be too contrasty even though an attempt has been made to reduce the shadow contrast by the additional center exposure. Thus the full benefits of the shadow control cannot be always realized except when combined with the present invention.

Another factor is of some practical importance as follows: While as previously pointed out, it is the distribution of relative gradient that is the important feature for comparison because average gradient and hence gradient can be altered to the desired value by proper processing of the screen, still it is the actual not the relative gradient that affects the final picture made therewith. Thus although it is not necessary to consider this factor when appraising the improvement gained by any particular procedure, the dot Type XIV is even better than might be imagined from Fig. 13B. Since in Fig. 13A curve XIV practically matches curve I throughout the region from 0 to .7, the tone reproduction by screen of Type XIV is practically perfect. Possibly a more fair comparison would be of gradient rather than relative gradient or since Types II to XIV can only be compared by relative gradient, Type I curve could be considered without its center tip (density 1.8) so that its average gradient would be only 1.3 (density at .9 of 1.60 and at 1.0 of 1.70 say).

Having thus described the various embodiments of my invention I wish to point out that it is not limited to the specific examples given but is of the scope of the appended claims.

What I claim and desire to secure by Letters Patent of the United States is:

1. A contact halftone screen comprising elements which are graded substantially continuously in density from the corners to the centers thereof, the density gradient in the regions of least density which are said corners being zero only at said corners and varying slowly from zero to a high gradient in the regions of average density and in which the average gradient is between .9 and 2.0 and the relative gradient is between .3 and .7 at a point .3 of the way from the corner to the center of each element and is less than unity at a point .38 of said way.

2. A contact halftone screen comprising elements which are graded substantially continuously in density from the corners to the centers thereof, the density gradient being zero only at said corners and at said centers, the gradient varying slowly from zero at the corners to a high gradient in the regions of average density and the gradient varying rapidly from zero at the centers to a high gradient in the regions of average density and in which the average gradient is between .9 and 2.0 and the relative gradient is between .3 and .7 at a point .3 of the way from the corner to the center of each element, is less than unity at a point .38 of said way, is between 1.2 and 2.5 at a point .75 of said way and is greater than unity at a point .85 of said way.

3. A contact halftone screen according to claim 1 in which the maximum density of one element exceeds the minimum density of that element by at lease .9.

4. A contact halftone screen according to claim 1 in which the average gradient is about 1.4 and the relative gradient is about .15 at a point .1 of the way from the corner to the center of each element, is about .5 at a point .3 of said way and is unity at a point about .4 of said way.

5. A contact halftone screen according to claim 2 in which the average gradient is about 1.4 and the relative gradient is about .15 of a point .1 of the way from the corner to the center of each element, is about .5 at a point .3 of said way, is unity at a point about .4 of said way, reaches a maximum of about 2 and is unity again at a point about .9 of said way.

6. The method of making a contact halftone screen which comprises placing a photosensitive layer a distance L behind a diaphragm having an aperture of diameter D therein, placing an ordinary halftone screen whose interval is S a distance K in front of the layer, where K has a value between $$\frac{SL}{4D} \text{ and } \frac{SL}{D}$$

exposing the layer through the aperture and the screen, slightly overall flashing the layer and developing the layer.

7. The method according to claim 6 in which the exposing of the layer through the aperture and the screen is limited to that which is slightly less than that necessary to induce a latent image in the regions of the layer most shadowed by said ordinary screen.

8. The method of making a contact halftone screen which comprises placing a photosensitive layer a distance L behind the diaphragm having an aperture of diameter D therein, placing an ordinary halftone screen whose interval is S a distance K in front of the layer, where K has a value between $$\frac{SL}{4D} \text{ and } \frac{SL}{D}$$

exposing the layer through the aperture and the screen, overall flashing the layer to increase the minimum density by about .5 and developing the layer to an average gradient of about 1.4.

9. The method according to claim 8 in which the exposing of the layer through the aperture and the screen is limited to that which is slightly less than that necessary to induce a latent image in the regions of the layer most shadowed by said ordinary screen.

10. The method of making a contact halftone screen which comprises placing a photosensitive layer a distance L behind the diaphragm having an aperture of diameter D therein, placing an ordinary halftone screen whose interval is S a distance K in front of the layer, where K has a value between $$\frac{SL}{4D} \text{ and } \frac{SL}{D}$$

exposing the layer through the aperture, at least a portion of the exposure being to light which is more intense in the center than near the edges of the aperture, slightly overall flashing the layer and developing the layer.

11. The method according to claim 10 in which the exposing of the layer through the aperture and the screen is limited to that which is slightly less than that necessary to induce a latent image in the regions of the layer most shadowed by said ordinary screen.

12. The method of making a contact halftone screen which comprises placing a photosensitive layer a distance L behind the diaphragm having an aperture of diameter D therein, placing an ordinary halftone screen whose interval is S a distance K in front of the layer, where K has a value between $$\frac{SL}{4D} \text{ and } \frac{SL}{D}$$

exposing the layer through the aperture, at least a portion of the exposure being to light which is more intense in the center than near the edges of the aperture, overall flashing the layer to increase the minimum density by about .5 and developing the layer to an average gradient of about 1.4.

13. The method according to claim 12 in which the exposing of the layer through the aperture and the screen is limited to that which is slightly less than that necessary to induce a latent image in the regions of the layer most shadowed by said ordinary screen.

JOHN A. C. YULE.